June 9, 1964 A. V. HORNER 3,136,067

MARKING DEVICE FOR STUDDING IN BUILDING CONSTRUCTION

Filed Feb. 2, 1961

INVENTOR

Albert V. Horner

United States Patent Office 3,136,067

Patented June 9, 1964

3,136,067
MARKING DEVICE FOR STUDDING IN BUILDING CONSTRUCTION

Albert V. Horner, San Francisco, Calif. (% Canadian Research & Development Foundation, 1434 Queen St. W., Toronto 3, Ontario, Canada)

Filed Feb. 2, 1961, Ser. No. 86,769
1 Claim. (Cl. 33—137)

This invention relates to improvements in measuring devices, and more particularly to improvements in measuring devices in which a conventional tape measure, as utilized by carpenters and the like, is combined with slots formed therein at regular intervals to facilitate the measuring and marking of standard spacings and as that of studding or the like.

In building construction it is conventional practice to mark out the desired positions of upright studding or the like, upon horizontal beams or plates by means of a rule and pencil or chalk. This method has the disadvantages that it is time consuming and liable to human error.

It is also conventional practice to utilize a premarked paper tape which may be adhesively attached to the beams or the like requiring to be marked. This tape, however, is fragile, and it does not combine standard measurement markings which may be required for special marking out jobs.

It is an object of this invention to provide a lay-out tape for carpenters in the following called a marking tape, which will permit an operator to accurately mark the desired position for studding or the like with no possibility of error.

It is another object of this invention to provide a marking tape which is reusable.

It is still another object of this invention to provide a marking tape that may carry a scale on the outer face thereof, in feet and inches or other convenient divisions.

It is a further object of this invention to provide a tape that may be accurately located at the free end thereof by means of a swivable stop.

It is another object of this invention to provide a marking tape in which permanent holes may be formed to facilitate securing the tape to a beam or the like.

It is still another object of this invention to provide a marking tape that is sufficiently flexible to be coiled and retained upon a reel until required for use.

These and other objects and features of this invention will become apparent when taken in conjunction with the accompanying drawings in which.

Figure 1:
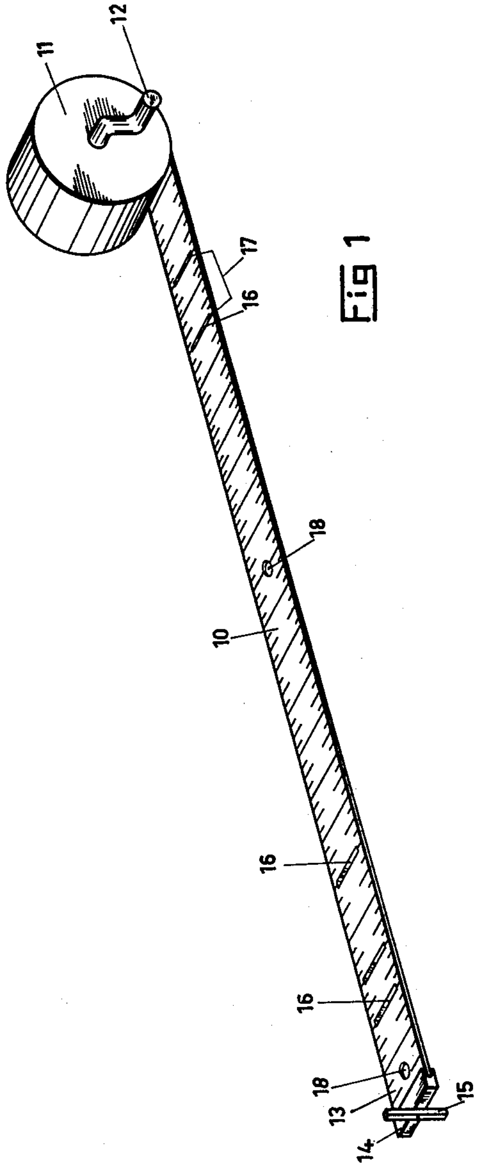
FIG. 1 is a perspective view of a marking tape embodying this invention, illustrating particularly the holes and slots formed therein and the swivable end stop.

Referring to FIG. 1, a flexible tape 10 of thin steel strip or the like is coilably retained upon a drum 11 by means of a conventional handle and ratchet mechanism 12. The free end 13 of tape 10 is reinforced by means of a rigid end piece 14 in which free end 13 of tape 10 is permanently enclosed.

A stop 15 is pivotally fitted to the outer edge of end piece 14 and is adapted to lie flush with end piece 14 upon not being required for use. Stop 15 may be moved in angular relationship with end piece 14 and, therefore, with tape 10, to provide a stop means upon tape 10 being laid upon a beam or the like and end 13 of tape 10 being required to be held in alignment with one edge thereof.

A plurality of slots 16 are formed through tape 10 and laterally thereto and, for standard building practices, slots 16 should be formed at the two inch, three inch and five inch stations. Subsequent slots 16 are formed in pairs 17, each pair 17 being spaced apart for a distance of two inches and subsequent pairs 17 being located at sixteen inch centres along tape 10.

In this preferred embodiment, therefore, the pair 17 of slots 16 following pair 17 located at the three inch and five inch stations are located at the nineteen inch and twenty-one inch stations. Subsequent pairs 17 will be at the thirty-five inch and thirty-seven inch stations and so on.

A plurality of holes 18 are also formed through tape 10, the initial hole 18 being located adjacent end piece 14, the remaining holes 18 being located midway between adjacent pairs 17 of slots 16, such as, for instance, at the twelve inche and twenty-eight inch stations.

Holes 18 permit tape 10 to be retained in position by means of carpenter's nail sets or the like being inserted therethrough. Upon tape 10 being located in the required position by this means, slots 16 may be utilized as templates for a pencil, or for a stencil brush in order to mark the locations for studding or the like. Upon paint being utilized to make the desired markings, excess paint may be removed from tape 10 by means of a rag or the like prior to tape 10 being reeled into drum 11.

Figure 2:
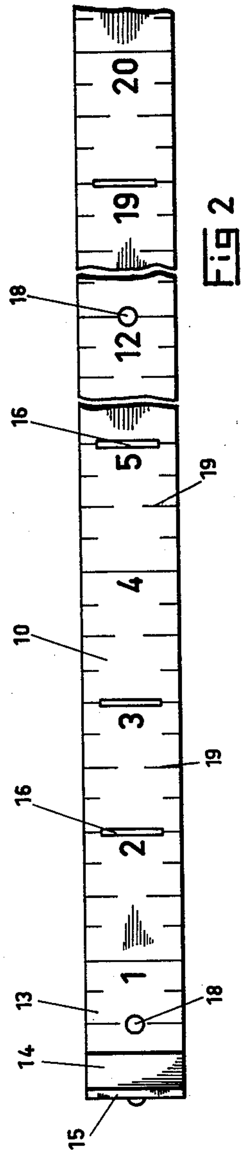
FIG. 2 is a fractional perspective view of a marking tape as illustrated in FIG. 1 showing the holes and slots in greater detail and the end stop in its housed position.

Referring to FIG. 2, it may be noted that slots 16 are centrally located within tape 10 and extend as close to the edges of tape 10 as is practical without the danger of weakening tape 10.

Conventional markings 19 on the surface of tape 10 permit tape 10 to be utilized for standard measuring should slots 16 not be required.

The arrangement of the three adjacent slots 16 at free end 13 of tape 10 permits the marking out of corner studding and the like wherein allowances must be made for the addition of insulation material or the like to the outer surfaces of the studding.

It should be understood that the measurements quoted herein are illustrative of a tape 10 adapted to be utilized in standard building construction, it should be understood, however, that slots 16 may be formed in tape 10 in any other desired locations for other than standard construction.

The general design of the individual parts of the invention as explained above may be varied according to requirements in regard to manufacture and production thereof, while still remaining within the spirit and principle of the invention, without prejudicing the novelty thereof.

The embodiments of the invention in which an exclusive property or privilege is claimed are defined as follows:

A marking device for studding in building construction comprising an elongate flat strip member, said flat strip member having a first end and a second end, a plurality of slots perforated in said strip member, substantially transversely of said strip member, the first of said slots located a distance of two inches from said first end, the second of said slots located a distance of three inches from said first end, the third of said slots located a distance of five inches from said first end, the subsequent slots are located in pairs, the slots comprising each of said pairs being two inches apart, the first slot of the first of said pairs being located nineteen inches from said first end, the first slot of each of the subsequent said pairs being located sixteen inches from the first slot of each preceeding said pair, and a pivotally attached retaining means at said first end of said strip member.

References Cited in the file of this patent

UNITED STATES PATENTS 1,145,244 Hoffman ---------------- July 6, 1915
1,567,602 Keuffel ---------------- Dec. 29, 1925
2,187,087 Leary ------------------ Jan. 16, 1940
2,558,974 Mecklenburger ---------- July 3, 1951
2,778,118 Manville --------------- Jan. 22, 1957